United States Patent
Tortora

(10) Patent No.: US 10,859,978 B2
(45) Date of Patent: Dec. 8, 2020

(54) LUMINOUS DISPLAY DEVICE

(71) Applicant: The Swatch Group Research and Development Ltd, Marin (CH)

(72) Inventor: Pierpasquale Tortora, Neuchatel (CH)

(73) Assignee: The Swatch Group Research and Development Ltd, Marin (CH)

(*) Notice: Subject to any disclaimer, the term of this patent is extended or adjusted under 35 U.S.C. 154(b) by 215 days.

(21) Appl. No.: 16/052,762

(22) Filed: Aug. 2, 2018

(65) Prior Publication Data
US 2019/0056696 A1 Feb. 21, 2019

(30) Foreign Application Priority Data

Aug. 21, 2017 (EP) ..................................... 17187011

(51) Int. Cl.
| | | |
|---|---|---|
| *G04B 19/30* | (2006.01) | |
| *G03H 1/22* | (2006.01) | |
| *G04B 39/00* | (2006.01) | |
| *G04B 19/10* | (2006.01) | |
| *G04B 19/22* | (2006.01) | |

(52) U.S. Cl.
CPC ............ *G04B 19/30* (2013.01); *G03H 1/2205* (2013.01); *G03H 1/2286* (2013.01); *G04B 19/10* (2013.01); *G04B 19/226* (2013.01); *G04B 19/305* (2013.01); *G04B 39/00* (2013.01); *G03H 2223/23* (2013.01)

(58) Field of Classification Search
CPC ...... G04B 19/30; G04B 19/305; G04B 39/00; G04B 19/10; G04B 19/226; G03H 1/2286; G03H 1/2205; G03H 2223/23
See application file for complete search history.

(56) References Cited

U.S. PATENT DOCUMENTS

| | | | | |
|---|---|---|---|---|
| 3,463,118 | A * | 8/1969 | Wood ..................... | G04B 19/10 116/335 |
| 4,834,475 | A | 5/1989 | Robinson | |
| 5,184,848 | A | 2/1993 | Itoh et al. | |
| 6,011,650 | A | 1/2000 | Parker et al. | |
| 6,463,012 | B1 * | 10/2002 | Bar-Yona .......... | G04B 45/0007 368/223 |
| 6,806,644 | B2 * | 10/2004 | Ueno ................ | G02F 1/133617 313/510 |

(Continued)

FOREIGN PATENT DOCUMENTS

| | | |
|---|---|---|
| EP | 0 440 824 A1 | 8/1991 |
| EP | 2 950 167 A1 | 12/2015 |

(Continued)

OTHER PUBLICATIONS

European Search Report dated Feb. 22, 2018 in European Application 17187011.6 filed Aug. 21, 2017 (with English Translation of Categories of Cited Documents).

*Primary Examiner* — Sean Kayes
(74) *Attorney, Agent, or Firm* — Oblon, McClelland, Maier & Neustadt, L.L.P.

(57) ABSTRACT

The present invention concerns a holographic display device incorporated in a timepiece device comprising at least one movable hand, having a light source at its peripheral end, and a watch glass comprising at least one hologram at its periphery, said light source being arranged on the hand so that it reconstructs said hologram when it moves into a predetermined angular sector.

9 Claims, 2 Drawing Sheets

(56) References Cited

U.S. PATENT DOCUMENTS

| | | | | |
|---|---|---|---|---|
| 7,839,726 | B2* | 11/2010 | Winkler | G04B 19/30 |
| | | | | 368/223 |
| 9,727,025 | B1* | 8/2017 | Rupert | G04B 49/02 |
| 2009/0185304 | A1* | 7/2009 | Harley, Jr. | G04B 19/28 |
| | | | | 359/894 |
| 2015/0346690 | A1 | 12/2015 | Tortora | |
| 2017/0146374 | A1* | 5/2017 | Aburto Crespo | G03H 1/2286 |

FOREIGN PATENT DOCUMENTS

| | | |
|---|---|---|
| JP | 6-289169 | 10/1994 |
| WO | WO 86/05269 A1 | 9/1986 |
| WO | WO 99/44082 A1 | 9/1999 |

\* cited by examiner

LUMINOUS DISPLAY DEVICE

This application claims priority from European patent application No. 17187011.6 filed on Aug. 21, 2017, the entire disclosure of which is hereby incorporated herein by reference.

FIELD OF THE INVENTION

The present invention relates to luminous display devices for watches or clocks.

BACKGROUND OF THE INVENTION

The watch industry has always sought to improve the display of watches and clocks, in particular in dark environments or in darkness. For example, by using phosphorescent markings for a night-time display or internal lighting activated on demand, for illuminating the hour symbols and the hands. Moreover, original display devices have also enabled watch manufacturers to differentiate themselves from their competitors.

By way of example, European Patent documents EP2950167 and EP2950166 propose lighting via light sources disposed directly on or inside the hands. In this document, the sources are either directly disposed at the peripheral end of the hands or disposed in proximity to the axis of rotation. In this latter case, the hand includes a waveguide for guiding light along the hand.

WO Patent No. 86/05269 proposes replacing the hour symbols with holograms reconstructed from an external light source. The main object of this document is to eliminate parallax reading error by placing the plane of the virtual reconstructed image of the symbols in the same plane as the hands.

SUMMARY OF THE INVENTION

The present invention concerns a holographic display device incorporated in a timepiece device comprising at least one movable hand having a light source at its peripheral end, and a glass comprising at least one hologram at its periphery, said light source being arranged on the hand so that it reconstructs said hologram when it moves into a predetermined angular sector of the glass.

Advantageously, a plurality of holograms are disposed on at least one circumference, so that the holograms are reconstructed in succession when the hand moves into the corresponding angular sector. This plurality of holograms includes, for example, the hour or minute symbols of a watch.

When the timepiece device includes a first and a second hand, one light source is advantageously disposed on each hand, and the plurality of holograms is disposed on a first and a second circumference so that the holograms disposed on the first circumference are reconstructed in succession by the light from the first hand, and the holograms disposed on the second circumference are reconstructed in succession by the light from the second hand.

Advantageously, the display device glass includes at least one diffraction grating, arranged on the internal surface of the glass to diffract light at an angle greater than the critical angle of total reflection, at least one hologram being disposed on the glass in order to be reconstructed by the diffracted beam, preferably after total reflection at the external surface of the glass.

Preferably, the diffraction grating is a blazed or holographic grating.

Advantageously, a plurality of diffraction gratings are disposed on at least a first circumference and a plurality of holograms are disposed on a second circumference, the light source at the peripheral end of the hand being arranged to successively illuminate, during use, the diffraction gratings of the first circumference, and the diffracted light successively reconstructing the corresponding holograms on the second circumference.

In this latter embodiment, when a second hand is present, it also preferably includes a second light source arranged to successively illuminate, during use, a plurality of diffraction gratings disposed on a third circumference, the diffracted light successively reconstructing a plurality of holograms disposed on a fourth circumference.

Advantageously, the light source(s) include(s) a primary source selected from the group consisting of light-emitting diodes (LED), laser diodes and vertical-cavity laser diodes. This primary source is preferably a monochromatic light source.

According to one embodiment of the invention, the light sources of the different hands emit on different wavelengths, so that the hands in the same angular sector are distinguished by their colours rather than by the position of the hologram.

According to a preferred embodiment of the invention, the light source(s) include(s) a waveguide housed inside the hand.

Advantageously, the hologram and/or the diffraction grating(s) include(s) (or consist of) a relief portion, etched, stamped, embossed or moulded on the internal surface of the glass.

DETAILED DESCRIPTION OF THE INVENTION

The present invention concerns a dynamic holographic display device, which uses the movement of light sources 3, 4 at the ends of the hands of a watch.

Figure 2:
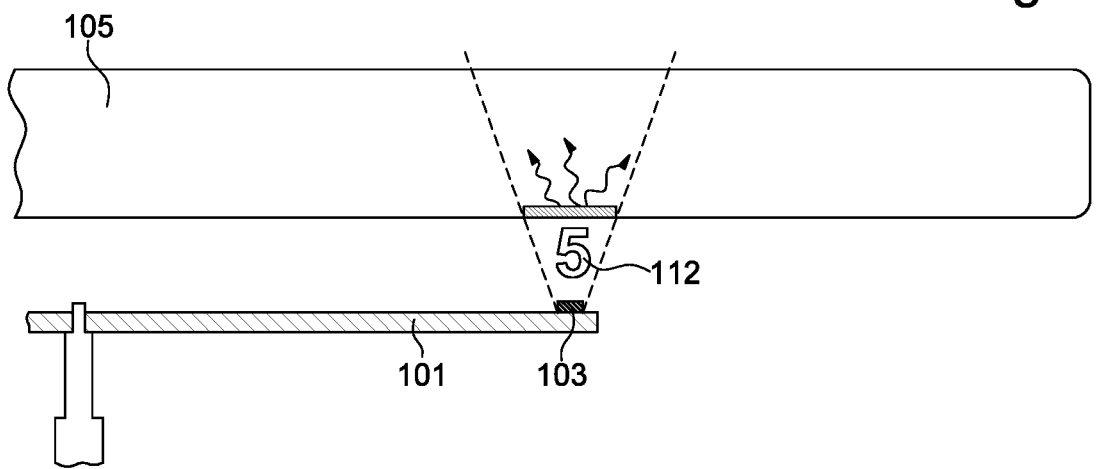
FIG. 2 represents another, simplified, example embodiment of the invention.

In its simplest embodiment, as represented in FIG. 2, a light source 103 disposed at the end of a hand 101 backlights a hologram 108 disposed on one face of a watch glass 105. Light source 103 is configured (with a suitable angle and wavelength) to reconstruct, via hologram 108, the desired virtual display image 112 when the hand moves into a determined angular sector.

Advantageously, a plurality of holograms are disposed on a circumference in order to be reconstructed in succession when the hand passes underneath each of these holograms. For example, each of these holograms corresponds to an hour of the day.

Preferably, the holograms are disposed on two circumferences, one disposed facing the hour hand and the other facing the minute hand, the first circumference including the hour symbol holograms, and the second circumference including the minute symbols.

Any light source suitable for reconstructing a hologram can be used. However, the most suitable sources, both from the viewpoint of miniaturisation and the viewpoint of the type of light emitted, are LEDs (light-emitting diodes) and VCSELs (vertical-cavity surface-emitting lasers). These sources have sufficient spatial and temporal coherence to reconstruct a hologram.

Advantageously, the hologram or holograms 8, 9, 108, 209 are disposed on the internal face of watch glass 5. This arrangement avoids damage to the hologram from wear or dirt when the watch is handled.

Preferably, the holograms are obtained by a relief portion on the surface of the glass, which makes possible the use of tools of mass production, such as stamping, moulding, etching. . . .

One drawback of the aforementioned embodiment is that, in the case of a watch, the very short distance between hand 101 and the internal face of watch glass 105 is very limited, so that the area illuminated by the light source is limited, which de facto limits the size of the hologram 112 seen.

Figure 1:
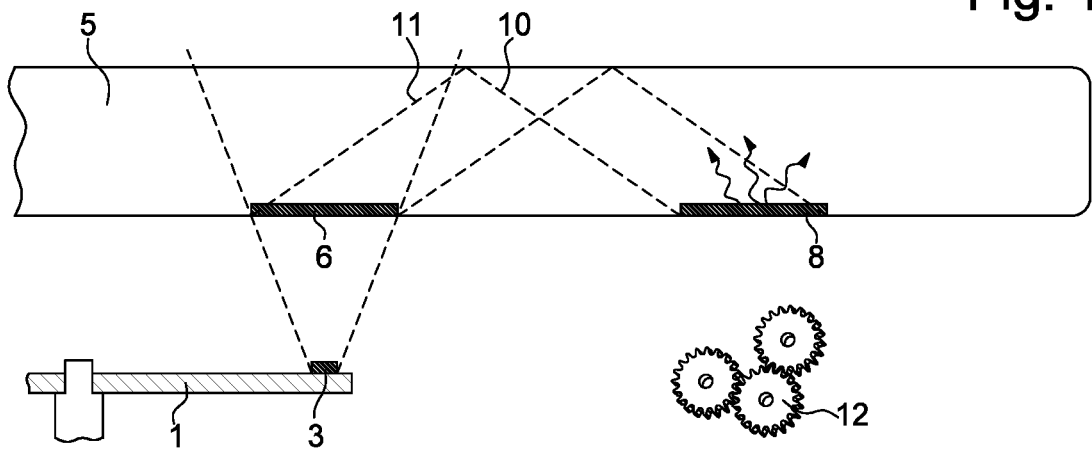
FIG. 1 schematically represents an example embodiment of the invention.
Figure 3:
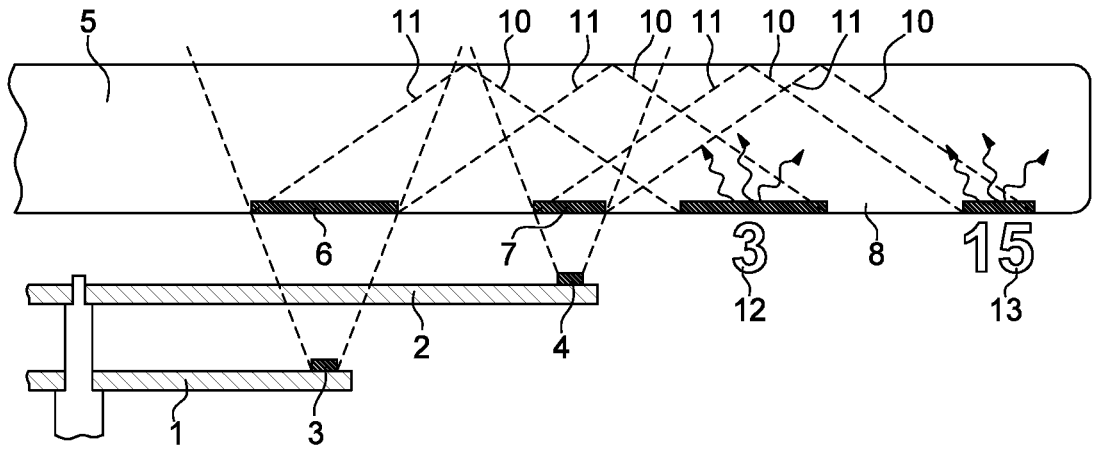
FIG. 3 represents a cross-section of a preferred embodiment of the invention.
Figure 4:
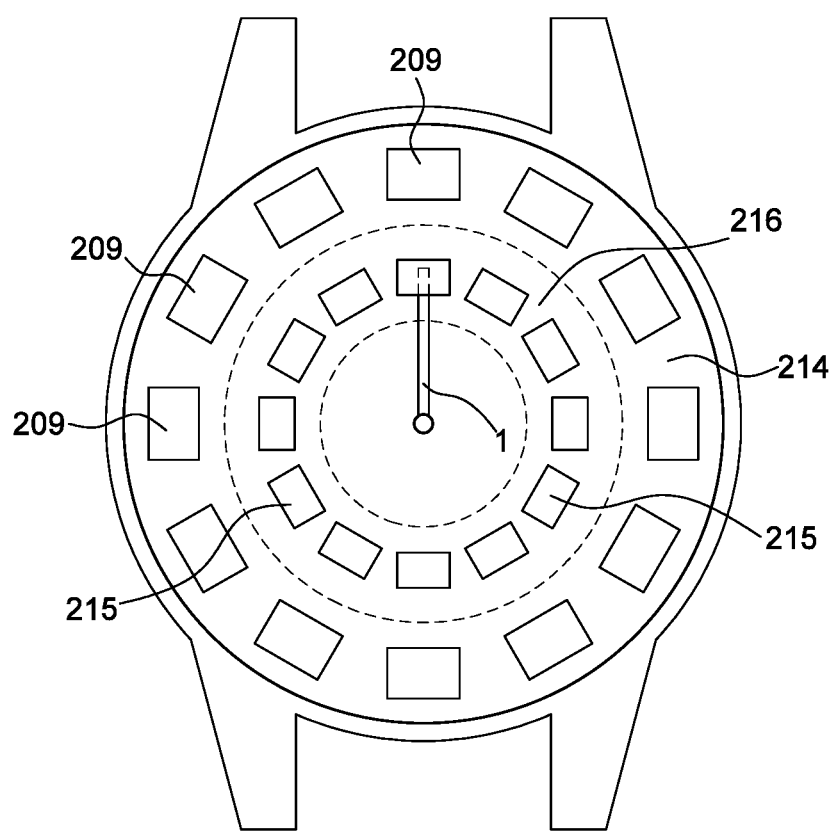
FIG. 4 represents a front view of a watch according to the invention.

To overcome this drawback, the preferred embodiment of FIGS. 1, 3 and 4 uses indirect lighting which allows for reconstruction with a larger hologram.

In this embodiment, the light source of the hand no longer illuminates hologram 8, 9 directly, but a diffraction grating 6, 7, diffracting light at a predetermined angle. Advantageously, this diffraction angle is greater than the critical angle of total reflection, so that the diffracted beam 11 forms a reflected beam 10 which then illuminates holograms 8 and 9. This geometry has numerous advantages, including the fact that the reconstructed hologram is not superposed on the light source, which avoids direct glare. The hologram is then also read using the technique associated with holography geometry invented by Y. Denisyuk, which makes it possible to avoid superposing a real image on a virtual image.

As represented in FIG. 4, the device of the invention preferably includes a plurality of diffraction gratings 215 disposed on a first circumference 216 diffracting the light emitted by the source at the end of hand 1 towards the corresponding holograms 209 disposed on a second circumference 214.

The plurality of diffraction gratings may advantageously be replaced by a circular diffraction grating made up of concentric rings forming the grating. This grating may be formed of circular or slightly deformed rings to illuminate, in a preferential manner, the holographic symbol areas when the hand is disposed between two holograms.

Advantageously, the diffraction grating(s) are blazed gratings or holographic gratings which maximise the refracted light at a predetermined angle (i.e. the proportion of light in refraction mode that induces the desired angle of refraction is maximised).

Like holograms, the diffraction gratings are preferably disposed on the internal surface of the watch glass and are formed by three-dimensional relief portions that can be moulded, etched, embossed. . . .

In the most elaborate embodiment of the invention, several hands of different diameters illuminate different diffraction gratings which illuminate holograms corresponding, for example, to the hours and minutes (or seconds).

Rather than spatially separating the holograms corresponding to the different hands, an advantageous alternative is to use different wavelengths in the sources of the different hands. In that case, the hours, minutes (and possibly seconds) will not only appear in a different colour, but also in a different size, with the size of the reconstructed image being a function of wavelength.

What is claimed is:

1. A watch, comprising:
   a holographic display device comprising a movable hour hand having a first light source mounted at a peripheral end of the hour hand and a movable minute hand having a second light source mounted at a peripheral end of the minute hand; and
   a watch glass comprising hour symbol holograms at a first circumference and minute symbol holograms at a second circumference, said first light source being arranged on the hour hand so that it successively reconstructs said hour symbol holograms when the hour hand moves into a first predetermined angular sector of the glass and said second light source being arranged on the minute hand so that it successively reconstructs said minute symbol holograms when the minute hand moves into a second predetermined angular sector of the glass.

2. The display device according to claim 1, wherein the glass includes at least one diffraction grating, arranged on the an internal surface of the glass to diffract light at an angle greater than the critical angle of total reflection, said hour symbol holograms being disposed on the glass in order to be reconstructed by a diffracted beam from the first light source after total reflection at the external surface of the glass.

3. The display device according to claim 2, wherein the diffraction grating is a blazed or holographic grating.

4. The display device according to claim 2, wherein a plurality of diffraction gratings are disposed on third circumference, the second light source at the peripheral end of the minute hand being arranged to successively illuminate, during use, the diffraction gratings of the third circumference, and the diffracted light successively reconstructing the corresponding minute symbol holograms on the second circumference.

5. The device according to claim 4, wherein the first light source on the hour hand is arranged to illuminate in succession, during use, a plurality of diffraction gratings disposed on a fourth circumference, wherein the diffracted light successively reconstructs the hour symbol holograms disposed on the first circumference.

6. The device according to claim 1, wherein the first light source and the second light source each include a primary source selected from the group consisting of a light-emitting diode, laser diode and vertical-cavity laser diode.

7. The device according to claim 6, wherein each of the first light source and the second light source is monochromatic.

8. The device according to claim 1, wherein the first light source includes a waveguide housed inside the hour hand.

9. The device according to claim 1, wherein the hour symbol holograms and the minute symbol holograms include a three-dimensional structure, etched, stamped, embossed or moulded on a surface of the glass facing the first light source and the second light source.

* * * * *